(12) United States Patent
Furudate et al.

(10) Patent No.: US 7,917,043 B2
(45) Date of Patent: *Mar. 29, 2011

(54) OPTICAL RECEIVER APPLICABLE TO MULTIPLE TRANSMISSION SPEED

(75) Inventors: Seigo Furudate, Yokohama (JP); Keiji Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/642,015

(22) Filed: Dec. 18, 2009

(65) Prior Publication Data

US 2010/0098437 A1    Apr. 22, 2010

Related U.S. Application Data

(62) Division of application No. 11/411,224, filed on Apr. 26, 2006, now Pat. No. 7,668,469.

(30) Foreign Application Priority Data

Apr. 27, 2005   (JP) ................................. 2005-130281

(51) Int. Cl.
    *H04B 10/06* (2006.01)
(52) U.S. Cl. ................. 398/210; 398/206; 398/207
(58) Field of Classification Search ........... 398/202–214
    See application file for complete search history.

(56) References Cited

U.S. PATENT DOCUMENTS

| 7,668,469 | B2* | 2/2010 | Furudate et al. | 398/210 |
| 2002/0101641 | A1* | 8/2002 | Kurchuk | 359/189 |
| 2004/0145799 | A1 | 7/2004 | Sedic | |
| 2005/0135817 | A1* | 6/2005 | Harms et al. | 398/202 |
| 2005/0140454 | A1 | 6/2005 | Uesaka et al. | |

FOREIGN PATENT DOCUMENTS

| JP | 8-288913 | 11/1996 |
| JP | 11-340745 | 12/1999 |
| JP | 2000-151290 | 5/2000 |
| JP | 2002-368549 | 12/2002 |
| JP | 2003-23398 | 1/2003 |
| JP | 2004-274173 | 9/2004 |
| JP | 2005-197881 | 7/2005 |

OTHER PUBLICATIONS

Japanese Office Action issued Dec. 2, 2009 for priority Japanese Application No. 2005-130281 w/English language translation.

* cited by examiner

*Primary Examiner* — Dzung D Tran
(74) *Attorney, Agent, or Firm* — Smith, Gambrell & Russell, LLP

(57) ABSTRACT

The present invention provides an optical receiver that enables to vary the sensitivity depending on the transmission speed. The optical receiver provides a photodiode to generate the photocurrent, the pre-amplifier to convert the photocurrent to the voltage signal, the lead pin to supply the bias voltage to the photodiode, and the control block to generate the switching signal for varying the current-to-voltage conversion efficiency and the frequency bandwidth of the pre-amplifier based on the control signal. The control signal is commonly provided from the lead pin through which the bias voltage is applied. The control block interprets the signal applied to the lead pin and generates the switching signal.

5 Claims, 6 Drawing Sheets

OPTICAL RECEIVER APPLICABLE TO MULTIPLE TRANSMISSION SPEED

CROSS REFERENCE TO RELATED APPLICATION

This application is a division of Ser. No. 11/411,224, filed Apr. 26, 2006 and which is being incorporated in its entirety herein by reference.

This application closely relates to a patent application, serial number of which is Ser. No. 10/968,353, titled by "pre-amplifier and an optical receiver for an optical communication," filed by the same assignee with the present application.

BACKGROUND OF THE INVENTION

1. Field of the Invention

The present invention relates to an optical receiver, in particular, the invention relates to an optical receiver that receives optical signals with a multiple transmission speed.

2. Related Prior Art

Recently, various transmission speeds are applied in the optical communication, accordingly, it becomes difficult to attain an acceptable error rate for the transmission without matching the performance of the optical receiver, especially, the sensitivity and the frequency bandwidth of the pre-amplifier with the transmission speed. The Japanese patent published as H11-340745A has disclosed an optical receiver that escapes from the saturation of the output thereof by varying the feedback resistance of the pre-amplifier, which is connected in parallel to the inverting amplifier to amplify a faint signal output from the light-receiving device, depending on the output level of this inverting amplifier.

However, the optical receiver disclosed in the patent, because the gain of the inverting amplifier depends on the output level thereof, the performance of the amplifier is not always fit to the transmission speed. That is, even if the saturation of the output level may be prevented, the gain and the frequency bandwidth thereof are not always set to values adequate to the transmission speed of the communication.

A control signal may be externally provided to control the sensitivity, the gain and the frequency bandwidth, of the optical receiver. However, such configuration requires an additional lead pin to transmit the control signal in the package of the optical receiver, which brings the up-scaled package. Without making the electronic circuits installed within the package small, the optical receiver is hard to be shrunk.

The present invention is to provide an optical receiver that enables to vary its performance, especially, the gain and the frequency bandwidth, depending on the transmission speed of the communication with a simple arrangement.

SUMMARY OF THE INVENTION

One aspect of the present invention relates to an arrangement of the optical receiver that comprises a photodiode, a pre-amplifier, a control block, and a package. The photodiode generates a photocurrent by receiving an optical signal. The pre-amplifier converts the photocurrent into a voltage signal by a conversion gain and a frequency bandwidth. The control block generates a switching signal to vary the conversion gain and the frequency bandwidth of the pre-amplifier. The package encloses these devices of the photodiode, the pre-amplifier, and the control block, and provides at least a lead pin for supplying the bias voltage to the photodiode. In the present invention, the bias voltage is also led to the control block and includes the control signal to vary the conversion gain and the frequency bandwidth of the pre-amplifier.

Since the bias voltage includes the control information to vary the conversion gain and the frequency bandwidth of the pre-amplifier, the package is unnecessary to prepare additional lead pins to provide the control information, which may miniaturize the package of the receiver and, consequently, the size of the optical transceiver that installs the optical receiver.

The control information involved within the bias voltage may be a level. The comparator unit included within the control block compares the bias voltage with a reference level, and transfers the result of the comparison to a generator unit that is also included in the control block. The generator unit outputs a switching signal based on the comparison. This switching signal is brought to the pre-amplifier.

In the present invention, the pre-amplifier may be a trans-impedance amplifier. The switching signal output from the generator unit of the control block may vary a value of the trans-impedance of the pre-amplifier. Consequently, the conversion gain and the frequency bandwidth of the pre-amplifier may be varied.

The control information may be a pulse signal. The comparator unit may extract the pulse signal and a counter unit involved within the control block may count the pulse and generate the switching signal based on this count of the pulse signal.

Another aspect of the present invention is a method for controlling the optical receiver with a package providing a minimum number of the lead pin. In the present invention, the lead pin for supplying the bias voltage to the photodiode is commonly applied to a control pin for supplying a control signal to the control block installed within the package. The control block may include the comparator unit and the generator unit.

The method of the present invention comprises; (1) triggering the control block by setting the bias voltage to a trigger is voltage; (2) comparing the bias voltage with a preset reference level by the comparator unit; (3) generating the switching signal based on the comparison to vary the conversion gain and the frequency bandwidth of the pre-amplifier; and (4) setting the bias voltage to a preset voltage for the photodiode.

The package of the present invention is unnecessary to provide additional lead pins to supply the control signal to the pre-amplifier, because the bias voltage includes the control signal, and the control block within the package may analyze and extract the control signal from the bias voltage.

The control signal may be a level or may be a pulse. When the level signal is input, the comparator unit compares the level thereof with the reference level and the generator unit outputs the switching signal based on the comparison, while, when the pulse signal is input, the comparator unit compares the level of the pulse signal with the reference level to generate a reshaped pulse signal and the counter unit counts this reshaped pulse signal to generate the switching signal. In both cases, the switching signal may vary the conversion gain and the frequency bandwidth of the pre-amplifier.

DESCRIPTION OF PREFERRED EMBODIMENTS

Figure 1:
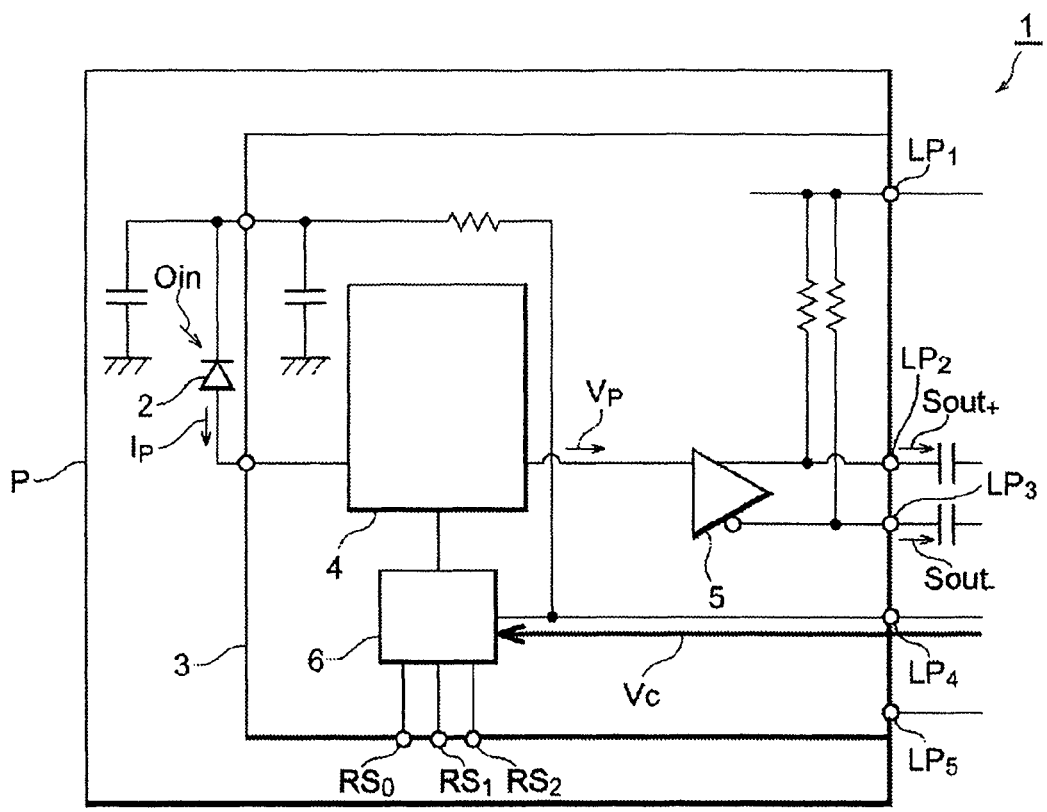
FIG. 1 is a block diagram of the optical receiver according to the first embodiment of the present invention.

Next, preferred embodiments of the present invention will be described as referring to accompanying drawings. In the drawings and the specification, the same symbols or numerals will refer to the same elements without overlapping descriptions.

FIG. 1 is a block diagram of an optical receiver according to the present invention. The optical receiver 1 generates signals, Sout+ and Sout−, based on an optical signal Oin input thereto, which includes a photodiode 2 to generate a photocurrent Ip corresponding to the optical signal Oin and a circuit 3, which has a configuration of an integrated circuit IC, both installed within a package P. The IC 3 includes a pre-amplifier 4, a main amplifier 5 and a control block 6. The pre-amplifier 4, connected to an anode electrode of the photodiode 2, converts the photocurrent Ip into a voltage signal Vp. The main amplifier 5, connected to the output of the pre-amplifier 4, amplifiers the voltage signal Vp and generates two signals, Sout+ and Sout−, complementary to each other. The control block 6 varies the current-to-voltage conversion characteristic of the pre-amplifier 4.

The package P provides five lead pins, $LP_1$ to $LP_5$, to communicate with the outside of the optical receiver. Respective lead pins are electrically connected to devices within the package P. Specifically, the first lead pin, $LP_1$, supplies an electric power Vcc to devices, the second and third lead pins, $LP_2$ and $LP_3$, are connected to outputs of the main amplifier 5 to bring out the complementary signals, Sout+ and Sout−, the fifth lead pin, $LP_5$, is for grounding the devices, and the fourth lead pin, $LP_4$, is connected to the cathode of the photodiode 2 for supplying the bias voltage, Vpd, thereto. Moreover, the fourth lead pin, $LP_4$, is also connected to the control block 6 to provide a control signal, Vc, thereto as combined with the bias voltage Vpd.

Next, the pre-amplifier 4 and the control block 6 within the IC 3 will be described in detail.

Figure 2:
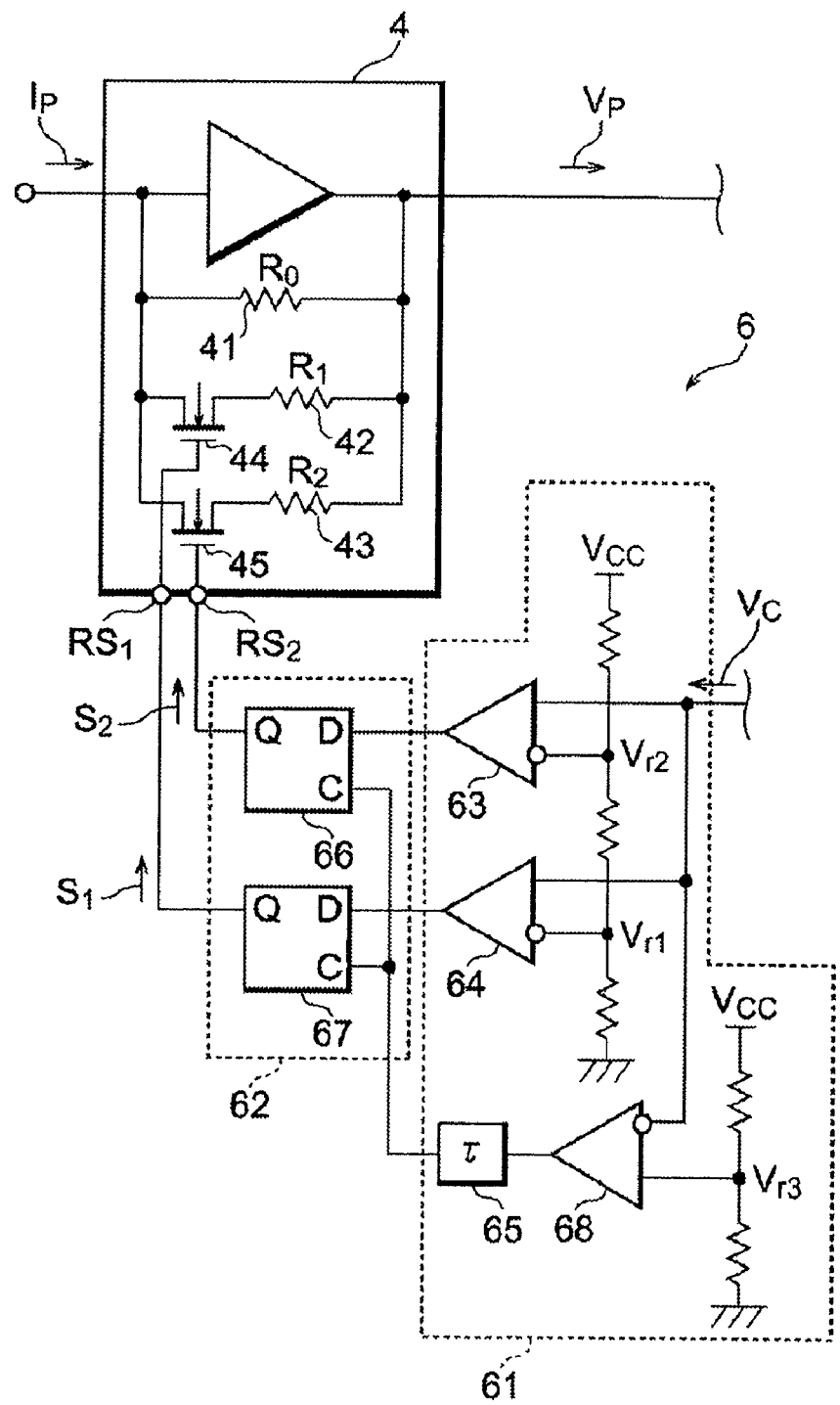
FIG. 2 is a circuit diagram of the control block of the embodiment shown in FIG. 1.

FIG. 2 schematically shows a circuit diagram of the pre-amplifier 4 and the control block 6. As shown in FIG. 2, the pre-amplifier 4 is one type of a feedback amplifier to receive the photocurrent Ip from the photodiode 2. A feedback resistance, which constitutes the feedback amplifier, includes three resistors, 41 to 43, two of which, 42 and 43, each connects a semiconductor switching device of a field effect transistor (FET), 44 or 45. The gate electrode of each FET is connected to the control block 6 through a terminal, $Rs_1$ or $Rs_2$, to switch its ON/OFF state. The pre-amplifier 4 adjusts the current-to-voltage conversion efficiency and the frequency bandwidth thereof by varying the total feedback resistance through the switching of the FETs, 44 and 45. That is, when the FETs, 44 and 45, are switched on, the feedback resistance decreases to reduce the conversion efficiency of the photocurrent Ip to the voltage signal Vp, while, the frequency bandwidth thereof may be widened. On the other hand, when the FETs, 44 and 45, are switched off, the feedback resistance becomes large and the current-to-voltage conversion efficiency becomes large while the frequency bandwidth is narrowed.

The control block 6 is configured to control the performance of the pre-amplifier 4 by analyzing the control signal Vc received via the lead pin, $LP_4$. The control block 6 includes a comparator unit 61 and a generator unit 62. The comparator unit 61 compares the control signal Vc with two references, $Vr_1$ and $Vr_2$, while, the generator unit 62, based on the comparison by the comparator, generates a signal to change the conversion efficiency and the frequency bandwidth of the pre-amplifier 4.

The comparator unit 61 includes two comparators, 63 and 64. The inverting input of the first comparator 63 receives the second reference $Vr_2$, while, the inverting input of the second comparator 64 receives the first reference $Vr_1$ smaller than the second reference, $Vr_2$. These two reference voltages, $Vr_1$ and $Vr_2$, are generated by dividing the supply voltage Vc with three resistors serially connected to each other and configured to be smaller than the bias voltage, Vpd, applied to the photodiode 2. The non-inverting inputs of two comparators, 63 and 64, receive the control signal Vc from the lead pin $LP_4$. Thus, the first comparator 63 outputs the logical "1" when the control signal Vc is greater than the second reference $Vr_2$, while, outputs the logical "0" when the control signal Vc is smaller than the second reference $Vr_2$. Similarly, the second comparator 64 compares the control signal Vc with the first reference $Vr_1$ and outputs the logical "1" or "0" depending on the comparison.

The comparator unit 61 further provides a third comparator 68 and a delay circuit 65 connected in serial to the third comparator 68. The inverting input of the third comparator receives the control signal Vc via the lead pin $LP_4$, while the non-inverting input thereof receives a third reference that is greater than the second reference and smaller than the supply voltage, $Vcc>Vr_3>Vr_2$. Thus, the third comparator outputs the logical "0" when the control signal Vc is greater than the third reference $Vr_3$, while, it outputs the logical "1" when the control signal Vc is smaller than the third reference $Vr_3$. This output from the third comparator is delayed by a preset time τ with the delay circuit 65. The third reference $Vr_3$ has a function to trigger off the comparator unit 61 to analyze the bias voltage Vpd.

The generator unit 62 includes two edge-triggered D-type flip flops (D-F/F), 66 and 67, which receive the output of respective comparators, 63 and 64, into the D-input thereof, while receive the output of the third comparator 65 into the clock input. These D-F/Fs are configured to latch the output of the comparators, 63 and 64, and to send the output thereof to the gate of the switching devices, 45 and 44, as the switching signals, $S_1$ and $S_2$. Schematically, when the output from the first comparator 63 is the logical "1", the first D-F/F 66 outputs the switching signal $S_2$ with a high level at the leading edge of the output from the delay circuit 65, namely, the timing delayed by τ from the point when the control signal Vc becomes smaller than the third reference $Vr_3$. On the other hand, when the output of the first comparator 63 is the logical "0", this D-F/F outputs the switching signal $S_2$ with a low level at the lead edge of the output from the delay circuit 65. Similarly, the other D-F/F 67 outputs the first switching signal $S_1$ with a level depending on the output from the second comparator 64.

Next, the operation of the optical receiver 1 corresponding to the control signal Vc will be described as referring to FIGS. 3 and 4.

Figure 3A:
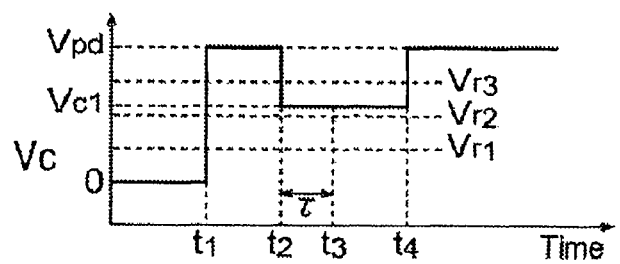
FIG. 3A shows a control signal with a level higher than the second reference.
Figure 3B:
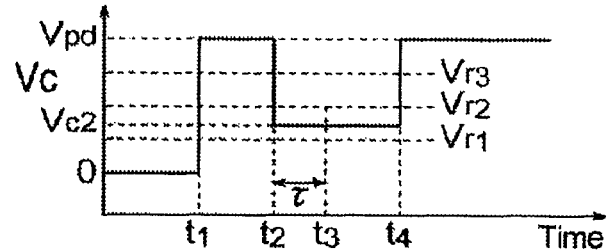
FIG. 3B shows a control signal with a level intermediate between the first and second references.
Figure 3C:
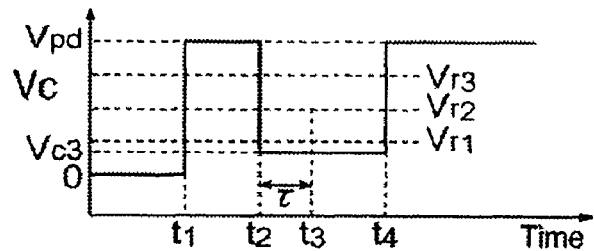
FIG. 3C shows a control signal with a level lower than the first reference.
Figure 3D:
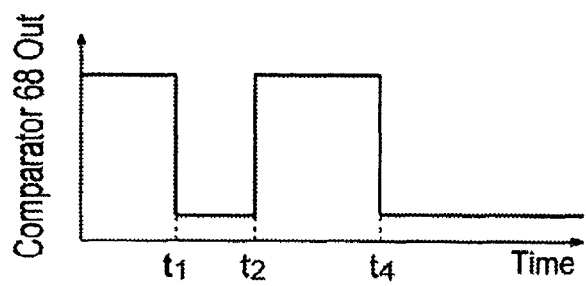
FIG. 3D shows an output from the third comparator.
Figure 3E:
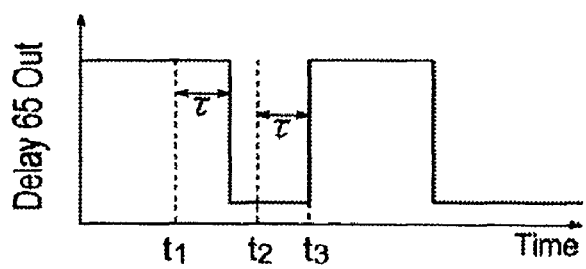
FIG. 3E shows an output from the delay circuit.
Figure 3F:
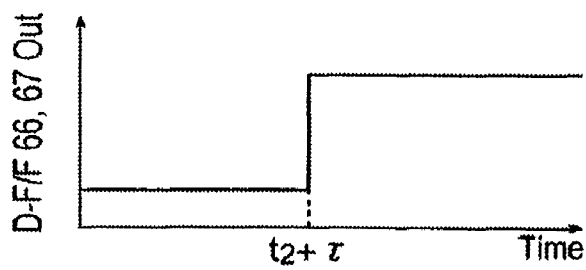
FIG. 3F shows the switching signals when the control signal shown in FIG. 3A is input.

FIG. 3A shows a behavior of the control signal Vc appeared in the lead pin $LP_4$ with a level greater than the second reference $Vr_2$ after a preset portion with a level equal to Vpd, FIG. 3B shows a case when the level of the control signal Vc is greater than the first level $Vr_1$ and smaller than the second level $Vr_2$, and FIG. 3C corresponds to a case when the control signal is smaller than the first level $Vr_1$. FIG. 3D shows a behavior of the output from the third comparator 68, FIG. 3E shows an output from the delay circuit 65, and FIG. 3F shows behaviors of the switching signals, $S_1$ and $S_2$, when the control signal Vc shown in FIG. 3A is input from the lead pin $LP_4$.

As shown in FIG. 3A, the optical receiver 1 starts its operation at $t=t_1$ by supplying the bias voltage Vpd to the photodiode via the lead pin $LP_4$ to generate the photocurrent Ip. In this state during the bias voltage Vpd is applied, the switching signals, $S_1$ and $S_2$, are kept low because the output of the third comparator is kept logical "0" level that makes no clock signal for the D-F/Fs, 66 and 67, as shown in FIGS. 3D and 3E. Accordingly, two switches, 44 and 45, are left OFF and the feedback resistance of the pre-amplifier 4 becomes only the resistor 41 with the resistance R0.

Then, when the control signal decreases from Vpd to $Vc_1$, which is greater than the first and second references, $Vr_1$ and $Vr_2$, at $t=t_2$, two comparators, 63 and 64, outputs the logical "1". For the third comparator 65, the output thereof varies from the logical "0" to the logical "1" to make a leading edge, because the control signal Vc crosses the third level $Vr_3$, which provides the clock delayed by $\tau$ from the output of the comparator 68 by the delayed circuit to the D-F/Fs, 66 and 67, as the clock signal, as shown in FIGS. 3D and 3E.

At the time $t=t_3$ ($=t_2+\tau$), the D-F/Fs, 66 and 67, set the output thereof to be high synchronous with the leading edge of the clock, and the switching signals, $S_1$ and $S_2$, with the high level are led to the switching devices, 44 and 45, to turn on them. Thus, the feedback resistance of the pre-amplifier 4 becomes a parallel configuration of three resistors, 41 to 43, as shown in FIG. 3F.

Subsequently, at the time $t=t_4$ ($>t_3$), the control signal Vc recovers the level of the bias voltage Vpd and the photodiode 2 generates the photocurrent Ip again.

When the control signal Vc becomes $Vc_2$ intermediate between the first and second levels, $Vr_1$ and $Vr_2$, at the time $t_2$, the comparators, 63 and 64, output the logical "0" and the logical "1", respectively. Raising the clock at the time $t=t_3=t_2+\tau$, the D-F/Fs, 66 and 67, output the switching signals, $S_1$ and $S_2$, with the high level and the low level, respectively, to the switching devices, 44 and 45. Thus, turning on the first device 44, while, leaving off the second device 45, the feedback resistance of the pre-amplifier 4 becomes a parallel connection of two resistors, 41 and 42.

When the control signal Vc is $Vc_3$ below the first reference $Vr_1$ at the time $t=t_2$, both comparators, 63 and 64, output the logical "0", and both D-F/Fs, 66 and 67, provide the switching signals, $S_1$ and $S_2$, with the low level to the switching devices, 44 and 45, at the leading edge of the clock. Thus, the switching devices, 44 and 45, are left off to set the feedback resistance of the pre-amplifier 4 to be single resistor 41.

Figure 4A:
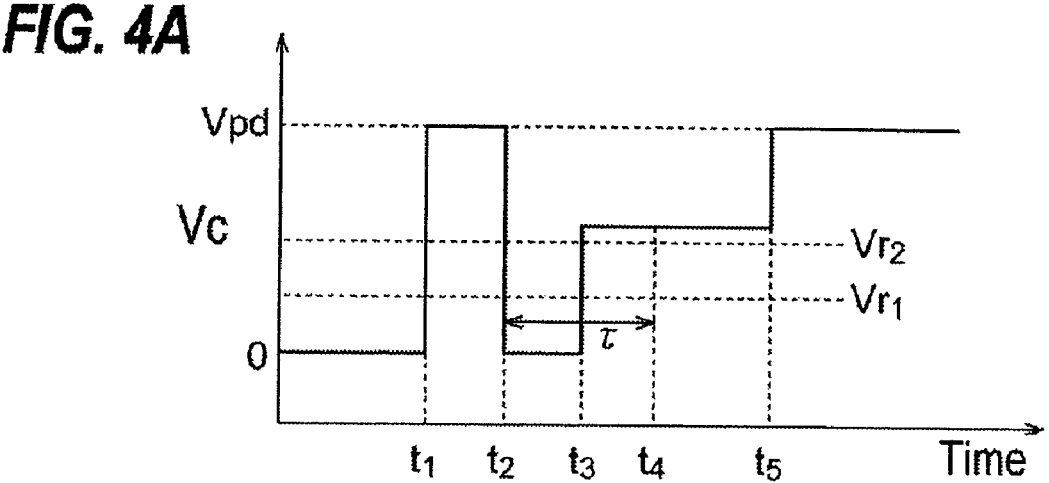
FIG. 4A shows a control signal with a level higher than the second reference.
Figure 4B:
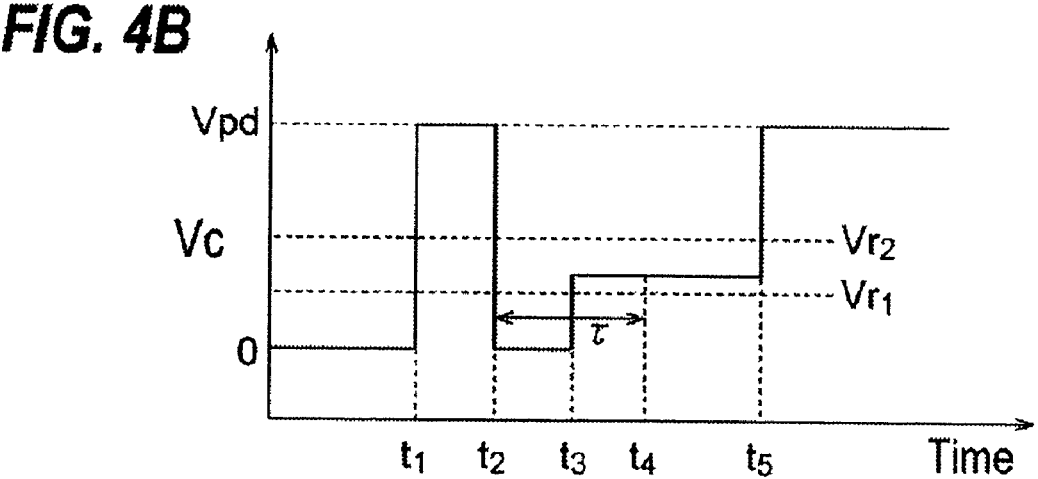
FIG. 4B shows a control signal with an intermediate level between the first and second references.
Figure 4C:
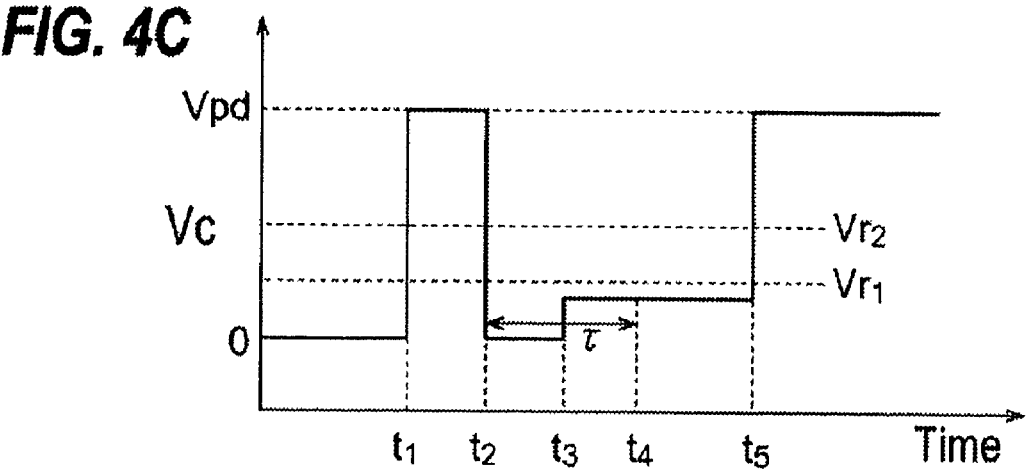
FIG. 4C shows a control signal with a level lower than the first reference.

Alternatively, the control block 6 may change the specification of the pre-amplifier 4 by the control signal Vc shown in FIGS. 4A to 4C. The control signal Vc shown in FIGS. 4A to 4C have a feature that the level thereof decreases to zero or less at the time $t_2$ after the first positive level of the bias voltage Vpd. In this case, the time $t_4$, which is delayed by $\tau$ after the falling edge of the control signal Vc, may be a timing to change the ON/OFF state of the switching transistors, 44 and 45. That is, raising the clock at the $t_4$ delayed by $\tau$, the switching signals, $S_1$ and $S_2$, vary their states depending on the level of the control signal Vc to set the feedback resistance of the pre-amplifier 4. In the circuit shown in FIG. 2, it is necessary for the third reference $Vr_3$ to be greater than the second reference $Vr_2$. When the control signal Vc inserts a falling edge after the first supplement of the bias voltage Vpd, the third reference $Vr_3$ may become optional.

According to the optical receiver 1 thus described, the conversion efficiency from the photocurrent Ip to the voltage signal Vp by the pre-amplifier 4 may be varied by the control signal applied to the same lead pin $LP_4$ the bias voltage Vpd is supplied to therethrough. Accordingly, the optical receiver 1 may change the conversion efficiency and the frequency bandwidth depending on the transmission speed of the optical signal without providing an additional lead pin for supplying the control signal in the package P.

The present invention does not restrict embodiments thereof to those shown in figures above described. A modified configuration described below may be applicable.

Figure 5:
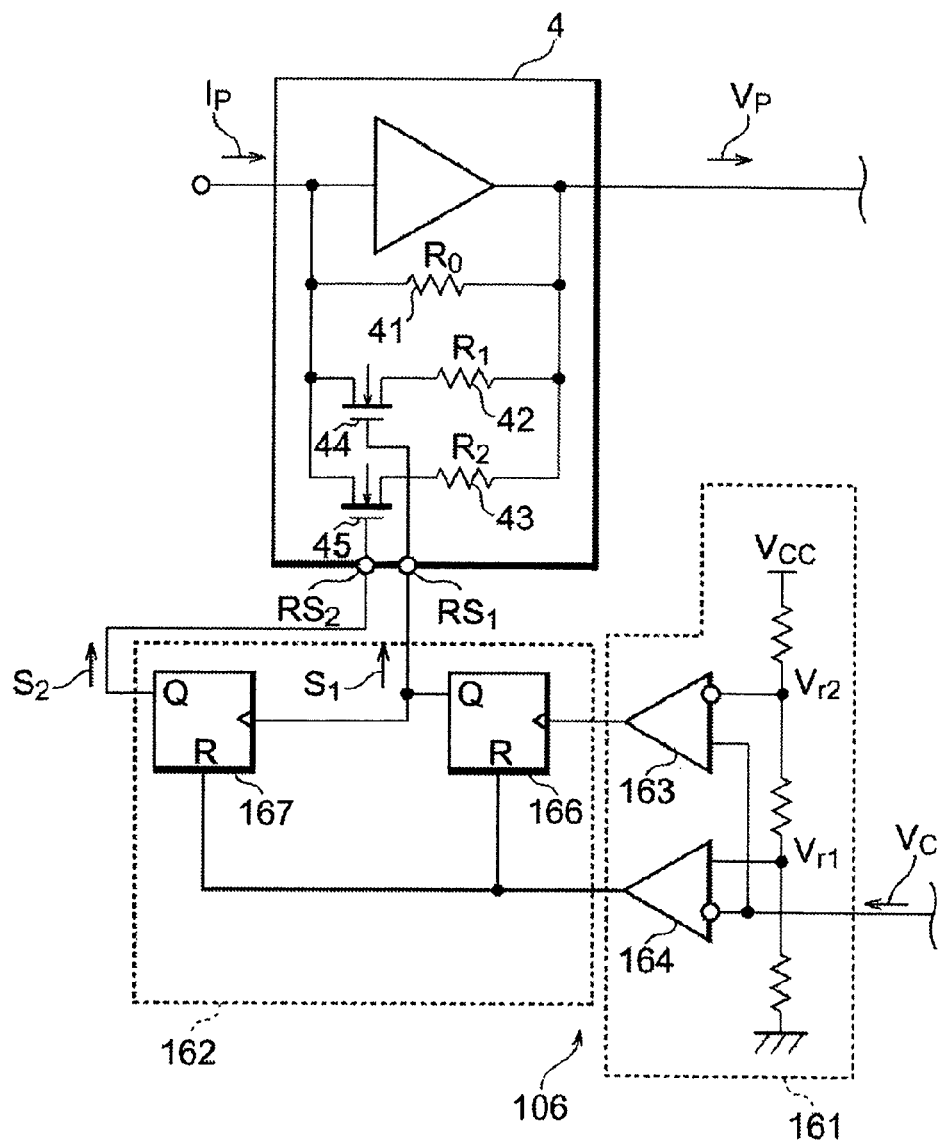
FIG. 5 shows a circuit diagram of the control block according to the second embodiment of the invention.

FIG. 5 shows the pre-amplifier 4 and a modified control block 106 according to an embodiment of the present invention. The control block 106 includes a comparator unit 161 and a counter unit 162. The comparator unit 161 includes two comparators, 163 and 164. The inverting input of the first comparator 163 receives the second reference $Vr_2$, while, the non-inverting input of the second comparator 164 receives the first reference $Vr_1$ smaller than the second reference $Vr_2$. Two references, $Vr_1$ and $Vr_2$, are generated by dividing the supply voltage Vcc with resistors and are configured to be smaller than the bias voltage Vpd applied to the photodiode 2. The non-inverting input of the first comparator 163 and the inverting input of the second comparator 164 receive the control signal supplied via the lead pin $LP_4$. Thus, the first comparator 163 outputs the logical "1" when the control signal Vc is greater than the second reference $Vr_2$, while, outputs the logical "0" when the control signal Vc is smaller than the second reference $Vr_2$. On the other hand, the second comparator 164 outputs the logical "1" when the control signal Vc is smaller than the first reference $Vr_1$, while, outputs the logical "0" when the control signal Vc is greater than the first reference $Vr_1$.

The counter unit 162 includes two T-type flip flops (T-F/F), 166 and 167, connected in serial to each other, which forms a quadruple counter. The output of the first comparator 163 is led to the clock input of the first T-F/F 166, and the output Q of the first T-F/F is led to the clock input of the second T-F/F. The output of the second comparator 164 is led to both T-F/Fs, 166 and 167, as a reset signal. These two T-F/Fs, 166 and 167, count the pulses superposed on the control signal Vc output from the first comparator 163, and output the switching signals, $S_1$ and $S_2$, based on the first and second bits of the counting, respectively, to the switching transistors, 44 and 45.

Figure 6:
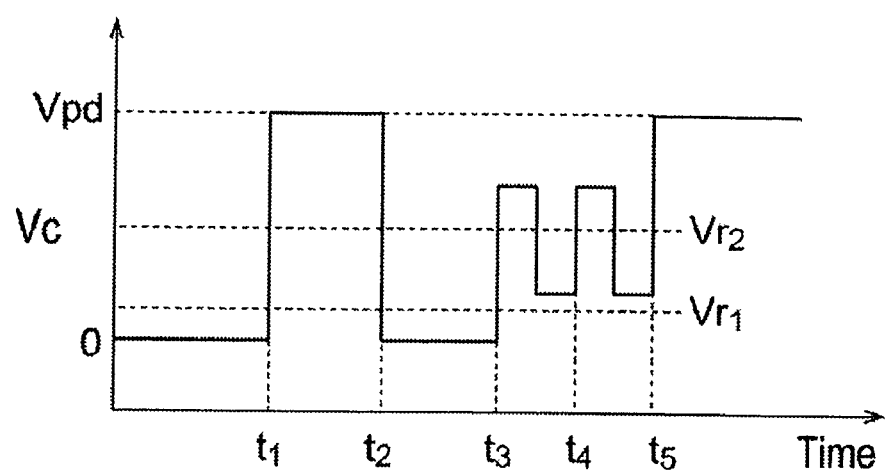
FIG. 6 shows a control signal input in the control block of the second embodiment.

FIG. 6 shows an example of the transition of the control signal Vc. At the time $t=t_1$, the optical receiver 1 starts its operation by supplying the bias voltage Vpd to the photodiode via the lead pin $LP_4$ to generate the photocurrent Ip. Subsequently, at the time $t=t_2$ synchronous with the falling of the control signal Vc to zero or at least a level smaller than the first reference $Vr_1$, the second comparator 164 outputs the logical "1" level to reset the T-F/Fs, 166 and 167. At the time $t=t_3$, the control signal Vc rises to a level between the second reference $Vr_2$ and the bias voltage Vpd, which makes the counter gain by one bit to output the first switching signal $S_1$ with the high level from the first T-F/F 166 and the second switching signal $S_2$ with the low level from the second T-F/F 167. Accordingly, the first switching transistor turns on, while, the second switching transistor is left off to configure the feedback resistance of the pre-amplifier 4 in a parallel combination of resistors, 41 and 42.

Similarly, at the time t=$t_4$, counting two pulses by the T-F/Fs, 166 and 167, the first device 44 turns off and the second switching device 45 turns on to configure the feedback resistance in a parallel combination of resistors, 41 and 43. At the time t=$t_5$, the control signal Vc crosses the second reference $Vr_2$ for the third time to advance the counter and the control signal Vc finally recovers the preset bias voltage Vpd to start the generation of the photocurrent Ip by the photodiode 2.

The optical receiver 1 with a modified control block 106 described above may change the performance of the pre-amplifier 4, especially, the frequency bandwidth and the conversion efficiency of the photocurrent Ip to the voltage signal Vp, by a simple circuit configuration even when the optical receiver is necessary to be applied in a multiple transmission rate. In particular, the optical receiver described above may prevent the malfunction at the switching of the feedback resistance because it is unnecessary to subdivide the reference level for the comparison of the control signal.

What is claimed is:

1. An optical receiver for receiving an optical signal with a plurality of transmission speeds and for outputting an electrical signal corresponding to the optical signal, comprising:
   a photodiode for generating photocurrent corresponding to the optical signal;
   a pre-amplifier for converting the photocurrent into the electrical signal with a conversion gain and a frequency bandwidth;
   a control block including a comparator unit and a counter unit, the comparator unit being configured to extract a pulse signal, the counter unit being configured to count a number of pulses extracted by the comparator unit and to generate a switching signal based on the number of pulses; and
   a package for enclosing the photodiode, the pre-amplifier and the control block, the package providing a lead pin for supplying a bias voltage to the photodiode and to the control block,
   wherein the switching signal varies the conversion gain and the frequency bandwidth of the pre-amplifier.

2. The optical receiver according to claim 1,
   wherein the counter unit counts the pulse signal by pausing a preset period after the bias voltage intersects a trigger voltage.

3. The optical receiver according to claim 1,
   wherein the pre-amplifier is a trans-impedance amplifier, and
   wherein the conversion gain and the frequency bandwidth of the pre-amplifier are varied by changing the trans-impedance.

4. The optical receiver according to claim 3,
   wherein the trans-impedance includes a resistor and a switching device connected in series to the resistor, and
   wherein the switching signal output from the control block turns off or turns on the switching device.

5. A method for controlling an optical receiver including a photodiode for generating a photocurrent by receiving an optical signal, a pre-amplifier for converting the photocurrent into a voltage signal with a conversion gain and a frequency bandwidth, a control block, and a package enclosing the photodiode, the pre-amplifier and the control block therein, the package providing a lead pin for supplying a bias voltage in common to the photodiode and the control block, the method comprising steps of:
   triggering the control block by setting the bias voltage to a trigger voltage;
   comparing the bias voltage with a preset reference by a comparator unit included within the control block by pausing a preset period after the control block is triggered and forming a pulse signal based on the comparison;
   generating a switching signal by a counter unit included within the control block by counting the pulse signal formed by the comparator unit, the switching signal varying the conversion gain and the frequency bandwidth of the pre-amplifier; and
   setting the bias voltage to a preset value to the photodiode.

* * * * *